Figure 1:
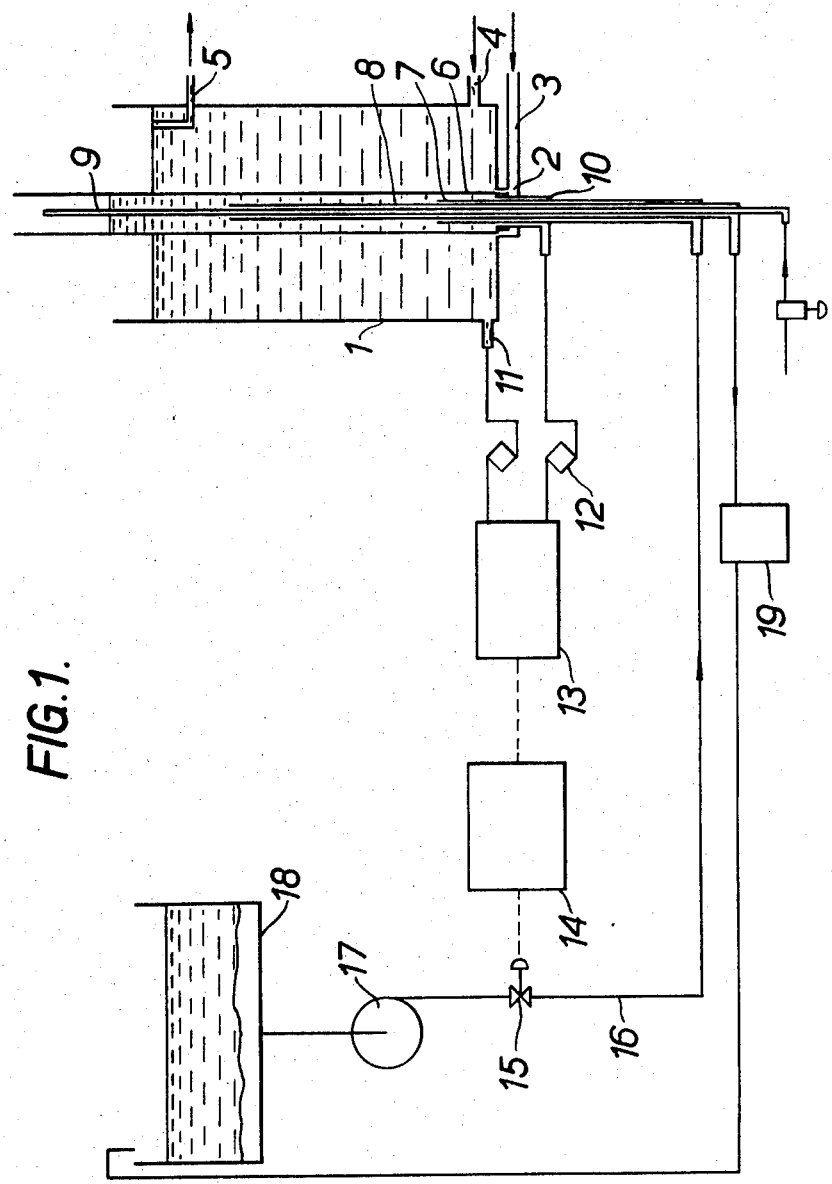

United States Patent

[11] 3,630,760

[72] Inventor  Kenneth William Taylor
              Higham Ferrers, England
[21] Appl. No. 821,753
[22] Filed     May 5, 1969
[45] Patented  Dec. 28, 1971
[73] Assignee  Lever Brothers Company
              New York, N.Y.
[32] Priority  May 6, 1968
[33]          Great Britain
[31]          21,291/68

[54] METHOD OF PREPARING COLLAGEN SAUSAGE-CASING TUBING
     7 Claims, 2 Drawing Figs.

[52] U.S. Cl. ................................................. 99/176,
                                        18/14 A, 264/202
[51] Int. Cl. .......................................... A22c 13/00
[50] Field of Search ............................................ 99/175,
              176; 264/202; 18/14 A, 14 G, 14 R, 14 RR

[56]              References Cited
              UNITED STATES PATENTS
1,601,686   9/1926   Henderson ................... 99/176
2,337,927  12/1943   Reichel ........................ 18/14 S X
3,008,185  11/1961   Goldman...................... 18/14 G
3,012,276  12/1961   Given............................ 18/14 A
3,123,653   3/1964   Lieberman ................... 264/202 X
              FOREIGN PATENTS
1,045,561  10/1966   Great Britain................ 264/202

Primary Examiner—Frank W. Lutter
Assistant Examiner—Robert Halper
Attorneys—Louis F. Kline, Jr., Melvin H. Kurtz and Edgar E. Ruff ABSTRACT: The diameter of collagen tubing prepared by extrusion into a setting bath is controlled by monitoring and maintaining substantially constant a pressure difference between the setting solution at a position inside the tubing being extruded and the setting solution in the bath outside the tubing.

METHOD OF PREPARING COLLAGEN SAUSAGE-CASING TUBING

The invention relates to the preparation of collagen tubes, particularly artificial sausage casings.

It is desirable to produce artificial casing by a process in which the casing is supported for further treatment after extrusion and setting by the maintenance within it of an air pressure slightly above atmospheric. The diameter of the casing during extrusion and setting must however be controlled to within fairly fine limits.

Moreover it is desirable that the diameter control system should be capable of compensating for the presence of imperfections such as pin holes in the casing being formed. If for example an attempt is made simply to maintain a constant head of setting solution within the casing as it is extruded into the setting bath, a pinhole and the resulting leak of air reduces the total pressure inside the casing at the level of the nozzle and a length of narrow casing is produced. It is difficult in any case to maintain a constant head, periodic variations tending to occur.

We have found that it is better not to try to maintain a constant head of setting fluid within the casing, but to maintain substantially constant the actual difference in hydrostatic pressure between chosen points within the setting solution inside and outside the casing being extruded. It is then possible to control a critical factor affecting the diameter, namely the difference in pressure, at the level of the extrusion nozzle, between the interior and exterior of the casing being formed. In the condition in which it emerges from the nozzle, the casing is not set; it is still readily expandable, and variations in pressure have a great effect.

The invention accordingly provides a method of preparing collagen tubing, particularly artificial sausage casing, in which collagen dough is extruded into a setting bath, setting solution is simultaneously passed to the interior of the extruded tubing and the diameter of the extruded tubing prepared is controlled by monitoring and maintaining substantially constant a difference between the hydrostatic pressure at a position within the setting solution inside the tubing being extruded and the hydrostatic pressure at a position in the setting bath outside the said tubing.

If changes in this difference in pressure are counteracted quickly, casing of satisfactorily uniform diameter can be produced. Conveniently the counteraction is automatic, being carried out in response to the output of a device sensitive to the difference in pressure. Where, as will normally be the case, a heat of setting solution within the casing is maintained by circulation of the solution in the space within the casing, a drop in the pressure difference can for example be compensated by increasing the rate of input or decreasing the rate of withdrawal or both and a rise in the pressure difference compensated by the opposite changes.

The use of the method of the invention will give casing of substantially constant diameter even if pinholes or other breaks in the casing would otherwise cause variations. The actual diameter of the casing produced depends on a number of factors. The properties of the dough itself are one factor; the rapidity of its setting in the setting bath another; the rate at which the casing is taken up from the extrusion head, that is to say the longitudinal tension in the casing, is another; and the pressure of air and the head of setting solution within the casing, that is to say the circumferential tension, is another. The actual pressure difference used is chosen after trial to suit these variables. If the pressure difference required is likely to change during extrusion, the actual diameter of the casing formed can be monitored, and the pressure difference maintained, reduced or increased as required. The preparation of casing which, while constant in diameter, is too large or too small can then be avoided.

Figure 2:
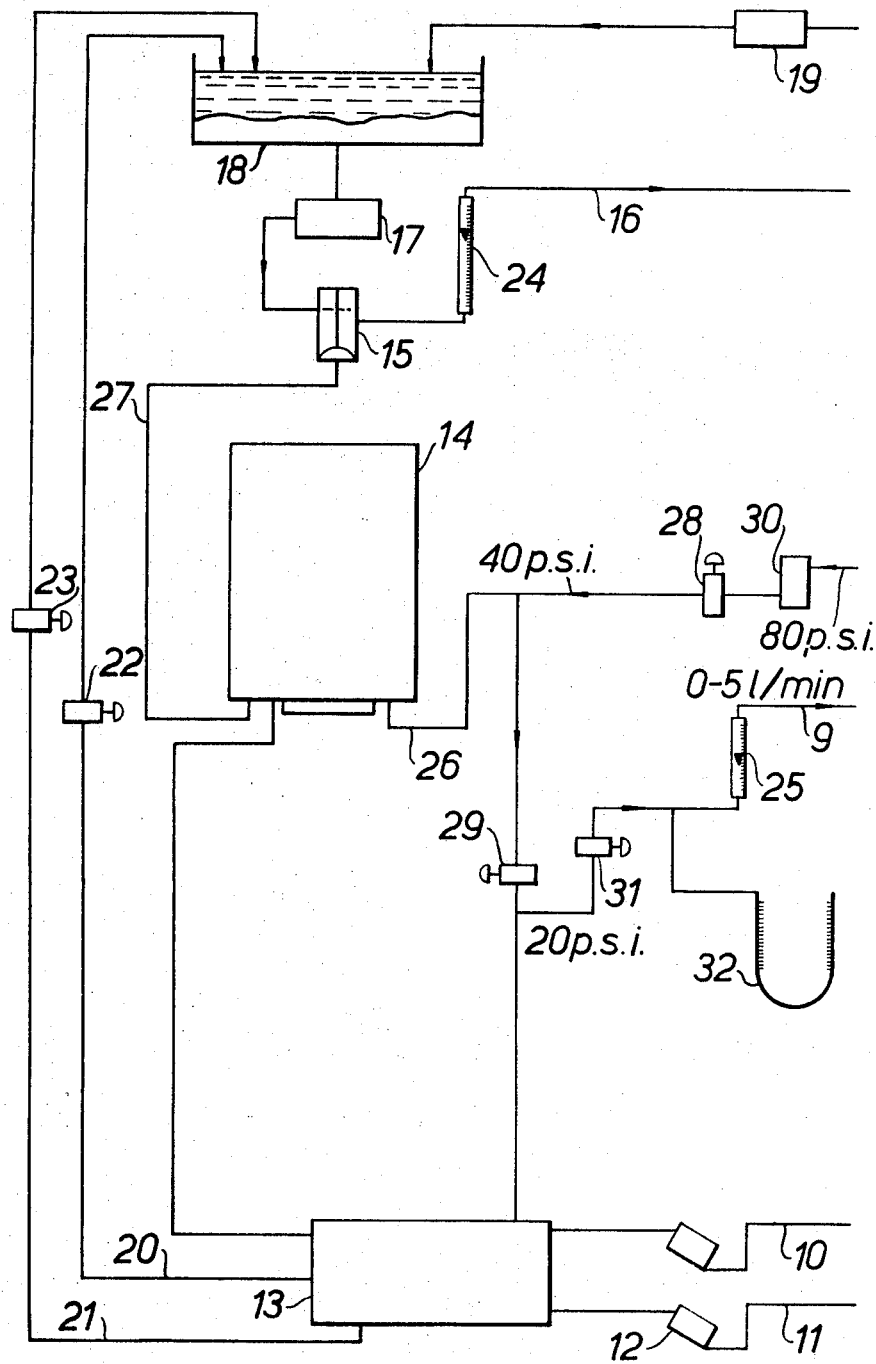

Apparatus by means of which the method of the invention may be applied is described by way of example with reference to the accompanying schematic drawings, FIGS. 1 and 2.

In FIG. 1 of the drawings 1 is a brine tank into which extrusion takes place and 2 is an extrusion nozzle fed from a dough inlet 3. The contrarotating cone extrusion nozzle referred to in our copending application, Ser. No. 743,265 is for example suitable. The brine tank is fed through a feed pipe 4 and excess brine escapes from an overflow 5.

The casing being formed is indicated at 6 and within it, working inwards, are concentric tubes: 7, for feeding in brine, 8, for withdrawal of brine, and 9, for feeding of inflating air. Outside them all within the inner member of the nozzle is a tube 10 leading to a takeoff for the measurement of the head of brine within the forming casing; seals are provided between this tube and the moving parts of the extrusion head. A takeoff for the head of brine external to the casing is indicated at 11. Both the takeoffs are connected through dirt-traps 12 to a differential-pressure amplifier cell 13. The output from this cell operates a brine flow control 14 actuating a valve 15 in a supply line 16 for the brine passing to the interior of the casing being formed. This brine is fed by a centrifugal pump 17 of maximum capacity 8 liters/minute itself fed from a brine reservoir 18 containing a bed of solid salt by means of which the concentration of the brine is maintained. Brine is withdrawn from the space within the casing by a gear pump 19 at a constant rage of for example 2 liters/minute and passed back to the brine reservoir.

In the operation of the apparatus the head of brine in the tank is constant in view of the presence of the overflow 5. Variation is effected by allowing more or less brine to pass to the space within the casing. If the total pressure at the internal takeoff drops, for example because an imperfection in the extruded casing allows air to escape, then the valve 15 is opened, slightly more brine passes to the space within the casing, and the pressure change is compensated by the increase in the head of brine that results. Conversely if some variation, for example the passing of a pinhole further along to a position where the air leak from it has a negligible effect on the pressure of air on the brine within the casing, then the rate at which brine is fed is cut by the buildup of the head of brine, added to the air pressure, becoming too great, resulting in the difference across the amplifier cell being too great and the brine flow control shutting the valve 15 down slightly.

FIG. 2 shows a slightly more developed form of the control system. The setting tank is omitted but the other components are given references corresponding to these in FIG. 1. Additional components are as follows. Lines 20 and 21 pass from the differential pressure cell through bleed taps 22 and 23 respectively to the brine reservoir 18. There is a flow meter 24 in the line 16 conducting brine to the interior of the casing and also a flow meter 25 in the line 9 carrying the air to inflate the casing. The valve 15 controlling the inflow of brine is air operated and lines 26 and 27 conduct air to and from respectively the brine flow control unit 14. A modification is that the air line, downstream of two regulators 28 and 29, the first of which receives its air from a filter 30, but upstream of a regulator 31, is connected direct to the differential pressure cell, thereby allowing more rapidly for any variations in air pressure than would be the case if transmission of the pressure through the brine was relied on alone. A U-tube pressure gauge 32 is provided downstream of the regulator 31.

Suitable air pressures when the apparatus is in use are 80 p.s.i. passing through filter 30 before regulator 28; 40 p.s.i. between regulators 28 and 29; and 20 p.s.i. between regulators 29 and 31. The flow of air through flow meter 25 may then be 0 to 5 l./min.

In operation the apparatus is started up as follows. First the brine reservoir 18 is filled with saturated brine and a layer of salt to approximately two-thirds of its depth. Then the compressed air supply is turned on and the air valve 15 is adjusted to a low value. The pump 17 is turned on and the bleed taps 22 and 23 are opened, then brine is allowed to pass through the system for 2 or 3 minutes to ensure saturation and the absence of air locks before the bleed taps are closed. Collagen dough is then started extruding from the nozzle and allowed to form on a protective tube placed around the tubes feeding brine to and taking brine from the interior of the casing. This protection, before the outer part of the setting bath is filled, prevents set collagen blocking the tubes. The next step is to start feeding brine to the setting bath and turn on the inflating air for the casing. The internal brine air valve is opened to maximum and when the brine overflows the protective tube this tube is gradually removed and formation of casing is commenced. Finally the pump 19 is switched on, withdrawing brine from within the casing and the air valve is adjusted to the required setting.

Extrusion may be continued for as long as desired. To close the apparatus down the dough is turned off, the bleed taps 22 and 23 are opened and the brine tank is emptied, and clean water is run through the system before finally turning off the pumps and air supply.

The invention is further illustrated by the following example, in which casing was prepared with the apparatus of FIG. 2.

EXAMPLE

Wet casing was extruded in the apparatus of FIG. 2, from an acid-swollen dough prepared according to the process described in example 1 of copending application, Ser. No. 806,923. A length was taken and measured in wet form at 1 foot intervals over 100 feet. Eighty percent of the casing was within the range of 30.3±1 mm. in diameter, and the limits of diameter variation were 28.5 to 31.7 mm. (All diameters are lay-flat). By way of comparison casing was made and measured similarly but without the differential pressure cell control, brine simply being pumped into and out of the space within the casing at controlled rates. Forty six percent of the casing was within a 2 mm. variation in diameter, the mean here being 31.5 mm. The total spread of diameter was greater, ranging from 28.5 to 34.5.

As a further comparison casing was extruded in a system in which a constant head of setting solution was maintained so far as possible by simple overflow, brine being pumped in at a constant rate. In this system only 39 percent of the casing was within a 2 mm. range in diameter, the mean being 32.5 mm. and the total range being very considerable, from 27.5 to 35.5 mm.

Similar measurements were taken over a 20 foot length at 2 inch intervals, and gave very similar results, though it happened that the lengths chosen were of somewhat smaller diameter. The actual figures were 90 percent at 29.3±1 mm. for the differential pressure system, with a total range of 27.5 to 30.5; 51 percent at 29.3±1 mm. for pumping in and out, with a total range of 26.5 to 32.5 mm.; and 42 percent at 30.5±1 mm. by the constant head by overflow system, with a total range of 26.5 to 33.5.

The rate of extrusion used was 27 feet per minute. The accuracy of control of diameter depends on the extrusion rate since the faster the extrusion rate the more likely it is that variations in the head of the setting fluid will occur more quickly than the response time of the control system allows them to be compensated.

I claim:

1. A method of preparing collagen sausage-casing tubing which comprises:
   i. extruding expandable collagen dough into a saturated brine setting bath in the form of a tube
   ii. simultaneously passing saturated brine setting solution into the interior of said extruded tubing
   iii. controlling the diameter of said extruded tubing by monitoring and maintaining substantially constant a difference between the hydrostatic pressure at a predetermined position within said brine solution inside the tubing being extruded and the hydrostatic pressure at a predetermined position in said brine both outside the said tubing.

2. A method according to claim 1, in which the control by reference to the difference between the hydrostatic pressure is supplemented by reference directly to changes in the air pressure within the tubing above the level of the setting solution.

3. A method according to claim 1 wherein:
   said dough is formed around a protective tube, said brine overflows said protective tube and said tube is thereafter removed.

4. A method according to claim 1, in which the pressure difference is maintained by compensating any change by the level of said setting solution within the tubing.

5. A method according to claim 4, in which the level of setting solution within the tubing is changed by changing the rate of feed of setting solution, the rate of withdrawal remaining constant.

6. A method according to claim 4, in which the level of setting solution within the tubing is changed by changing the rate of withdrawal of setting solution, the rate of feed remaining constant.

7. A method according to claim 4, in which the pressure difference is sensed by a differential pressure cell, the output of which effects operation of means adjusting the relative levels of setting solution inside and outside the tubing.

* * * * *